(12) United States Patent
Rueger et al.

(10) Patent No.: US 8,037,353 B2
(45) Date of Patent: Oct. 11, 2011

(54) METHOD FOR OPERATING A SYSTEM

(75) Inventors: Johannes-Joerg Rueger, Stuttgart (DE);
Udo Schulz, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 922 days.

(21) Appl. No.: 11/579,231

(22) PCT Filed: May 11, 2005

(86) PCT No.: PCT/EP2005/052153
§ 371 (c)(1),
(2), (4) Date: Oct. 29, 2007

(87) PCT Pub. No.: WO2005/114341
PCT Pub. Date: Dec. 1, 2005

(65) Prior Publication Data
US 2008/0215163 A1    Sep. 4, 2008

(30) Foreign Application Priority Data
May 18, 2004   (DE) .......................... 10 2004 024 536

(51) Int. Cl.
*G06F 11/00* (2006.01)
(52) U.S. Cl. ........................................... 714/23; 714/55
(58) Field of Classification Search .................... 714/23, 714/48, 55; 701/39
See application file for complete search history.

(56) References Cited

U.S. PATENT DOCUMENTS

| | | | |
|---|---|---|---|
| 4,347,563 A | | 8/1982 | Paredes et al. |
| 4,870,704 A | * | 9/1989 | Matelan et al. ............... 710/120 |
| 5,575,265 A | * | 11/1996 | Kurihara et al. ............... 123/520 |
| 5,758,190 A | * | 5/1998 | Johnson et al. .................. 710/48 |
| 5,761,414 A | * | 6/1998 | Akaishi et al. ................... 714/55 |
| 5,850,514 A | * | 12/1998 | Gonda et al. ..................... 714/55 |
| 6,125,461 A | * | 9/2000 | Huisman et al. ............... 714/724 |
| 6,226,576 B1 | * | 5/2001 | Torno et al. ...................... 701/34 |
| 6,556,901 B2 | * | 4/2003 | Sugimura et al. ................ 701/29 |
| 6,658,602 B1 | * | 12/2003 | Nakano ............................ 714/38 |
| 6,728,611 B2 | * | 4/2004 | Kamiya ........................... 701/33 |
| 6,748,555 B1 | * | 6/2004 | Teegan et al. .................... 714/38 |
| 7,117,081 B2 | * | 10/2006 | Sawaoka ....................... 701/114 |
| 7,647,145 B2 | * | 1/2010 | Eickhoff et al. ................. 701/29 |
| 7,693,649 B2 | * | 4/2010 | Groer et al. .................... 701/115 |
| 2002/0002429 A1 | * | 1/2002 | Sugimura et al. ................ 701/29 |
| 2002/0073361 A1 | * | 6/2002 | Sommer .......................... 714/38 |
| 2004/0153223 A1 | * | 8/2004 | Fujita et al. ...................... 701/29 |
| 2004/0244461 A1 | * | 12/2004 | Lenzing et al. .................. 73/1.34 |
| 2005/0034015 A1 | * | 2/2005 | Hashimoto et al. ............. 714/18 |
| 2006/0155426 A1 | * | 7/2006 | Steiger .............................. 701/1 |

FOREIGN PATENT DOCUMENTS

| | | |
|---|---|---|
| DE | 37 20 385 | 12/1987 |
| DE | 41 18 692 | 12/1992 |
| DE | 43 17 729 | 12/1993 |
| DE | 100 36 278 | 2/2002 |
| DE | 102 23 880 | 1/2004 |

* cited by examiner

*Primary Examiner* — Robert Beausoliel, Jr.
*Assistant Examiner* — Elmira Mehrmanesh
(74) *Attorney, Agent, or Firm* — Kenyon & Kenyon LLP

(57) ABSTRACT

A method for operating a system, as well as a computer program and a computer program product for executing the method. In the method for operating a system, which includes a plurality of control units, in the event that a special state exists for one of the control units, at least one of the other control units is informed about it.

15 Claims, 1 Drawing Sheet

METHOD FOR OPERATING A SYSTEM

This application filed on Oct. 29, 2007 is a national stage entry of PCT/EP05/52153 with an International Filing Date of May 11, 2005, which claims foreign priority to German application 102004024536.3, filed May 18, 2004.

FIELD OF THE INVENTION

The present invention relates to a method for operating a system, a system which has a plurality of control units, as well as a computer program and a computer program product for executing the method.

BACKGROUND INFORMATION

Modern vehicles have systems with an ever larger number of different control units which are interconnected with one another. In such a system, an error within one of the control units may have a detrimental effect on the function of other control units or even on the entire system.

A device for error storage in a control unit of a motor vehicle is described in the publication German Patent No. 41 18 692. This device includes an error-time counter module for detecting the respective time period in which the error continues and an error memory for saving error information.

German Published Patent Application No. 100 36 278 describes a method for monitoring a program execution via a debug logic. In order to provide a particularly reliable, but nonetheless as much as possible resource-saving monitoring of an execution of a program able to run on a microprocessor, it is here provided for the debug logic to be configured by the microprocessor and for the debug logic to perform an exception routine following a triggering of an exception condition during a program run.

SUMMARY OF THE INVENTION

It is the object of the present invention to minimize effects of errors within individual control units of a system on a function of the entire system.

In the method for operating a system, which includes a plurality of control units according to the present invention, in the event a special state exists for one of the control units, at least one of the other control units is informed thereof. During operation of the system, each individual control unit may, whether intentionally or unintentionally, get into the special state in which a function of this control unit deviates at least partially from a standard function.

Due to the approach according to the present invention it is achieved that the at least one of the other control units is informed about the changed state and adapts its function to the special state and registers and processes information, which the one of the control units conveys when the special state exists, by correspondingly taking this special state into account. The method is suitable for systems, for example, in which software is distributed over multiple control units.

In a preferred embodiment of the present invention, the method is executed in the event of a special state caused by an error of one of the control units. This is particularly suitable for error states in which communication of the affected control unit with the other control units can no longer be sustained for a certain period of time. This also includes states of the control unit in which it outputs unreliable or undefined values. The other control units are now warned prior to the occurrence of such values.

A measure, particularly a measure for treating the error, is preferably adopted for the one control unit. A typical example for such measures is what is known as recoveries in which the appropriate control unit is reinitialized via hardware or software reset. For example, recoveries are actively triggered by a function of the software when a software statement machine assumes state values which are undefined. As a rule, each recovery has its own recovery number which is saved past a reset and is thus available for diagnosis and error responses.

Control unit self-tests, for example RAM tests, etc., are typically executed as a function of the recovery number. A frequency of the respective recovery number is also saved simultaneously with the recovery number. Thus with the respective occurrence of the same recovery per time interval, the control unit may be brought into a sleep mode if the recovery has not corrected the error. In order to prevent all control units from immediately reporting an error and possibly switching off the respective connected functions in such situations, it is attempted in these control units to bridge corresponding down times in the communication via time-outs. Only if the communication fails to appear longer than was calibrated using the time-out may a corresponding system response take place.

According to the present invention, information that an exception, i.e., an error, and/or a recovery occurred is specifically utilized by conveying that information to at least one of the other control units. Recovery or reinitializing of the one control unit is used for correcting the error of that control unit. However, it may also be the case that such measures are taken routinely or for a reason not necessarily linked to an error, such as a control unit check. Since in this case one function of this control unit is affected, the other control units are informed accordingly.

In a preferred embodiment of the present invention, the at least one of the other control units is informed prior to an execution of the measure. The at least one other control unit is preferably informed about a duration of the special state. The duration may be ascertained as a function of the type of the special state. System behavior and error classification are thus improved by utilizing such information. The control unit in which an error occurs and/or in which a measure is to be taken conveys the particular information before the measure is executed. Due to the fact that information about the duration is also conveyed, the at least one other control unit of the system knows when the first control unit will be back in a normal state and will again reliably operate.

For example, the duration may be accurately evaluated by adding the run times of the applied self-tests subsequently to the measure or the recovery or based on the recovery number or other initialization routines, or the duration may be determined via run-time measurements after active triggering of the respective recoveries prior to delivery of the system or the software and stored in the control unit.

Errors, which are linked to a plurality of interconnected control units within a system, are thus also eliminated. The present invention is particularly suited for systems in which system functions are implemented across different control units.

By taking into account the type of the special state, it is decided in a refinement of the present invention whether an additional measure is taken by the at least one of the other control units. The information, conveyed by the one control unit, may be picked up directly by relevant control units, for example. With the knowledge of the anticipated duration until a resumption of the communication, it may be decided there whether a system response, i.e., the additional measure, is necessary or whether the special state of the first control unit may be tolerated in an appropriate operating situation of the system. It is possible to define a tolerance threshold as a function of a current system function and/or the type of the special state. Consequently, the system response may take place in a targeted manner and the system response may be immediately executed when it becomes clear that the duration of the measure or exception continues for too long. Previously it was necessary to wait for a time-out.

Using the present invention, it is now possible to unambiguously assign a cause for a system response. Ambiguous secondary errors or erroneous memory inputs are thus avoided. Application of fixed, operating point-independent time-outs no longer occur.

The system according to the present invention has a plurality of control units. In the event that a special state exists for one of the control units, at least one of the other control units must be informed thereof. The present invention is suitable for systems within vehicles, for example. Software of the system is distributed over multiple control units. Functions such as cruise control (ACC), ABS, ASR, and the like are implemented via these control units. A control unit responsible for a corresponding function conveys instantaneous requests to an engine controller which transforms these requests for providing a suitable injection quantity for the engine. The control units are preferably connected or interlinked with one another via a communication means such as a CAN (controller area network).

The computer program according to the present invention having program code means is provided for executing all steps of the method according to the present invention when the computer program runs on a computer or a corresponding processor, in particular a control unit in the system according to the present invention. A computer program product having program code means, which are stored on a computer-readable data medium, is accordingly provided for executing the method according to the present invention when the computer program product runs on a computer or a corresponding processor, in particular a control unit in the system according to the present invention.

It is possible, in a refinement of the present invention, to concentrate the handling of the special state (exception handling) in a higher-order control unit, e.g., an SG CAN gateway. All information about such particular operating states is gathered in this higher-order control unit, and optimum system responses are triggered on this basis. Error storage across the system is also implementable using such a concentrated approach, so that no more manifold and difficult-to-interpret error memory inputs are needed and error diagnostics is simplified. Moreover, it is conceivable to store exception handling redundantly in multiple control units, thereby increasing its availability.

The previously practiced concept of the time-out calibration is improved using the present invention. With increasing interconnection of the system functions, it proved to be more and more difficult to find a calibration method for the treatment of special states which is sensible in all operating states. If, in addition, the special state lasts longer than the expected time-out, in conventional systems it results in all control units inputting errors or secondary errors and error diagnostics is therefore more difficult. Previously unused valuable information, i.e., information that the control unit will soon trigger a recovery or that generally a special state occurs for this control unit and how long it will last until the control unit is again ready for operation, is advantageously utilized using the present invention.

It is understood that the features mentioned above and the features to be explained in the following are not only usable in the indicated combination but also in other combinations or as stand-alone features without leaving the scope of the present invention.

BRIEF DESCRIPTION OF THE DRAWING

The FIGURE shows a schematic representation of a preferred design of a system according to the present invention in different states during the execution of the method according to the present invention.

DETAILED DESCRIPTION

Figure 1A:
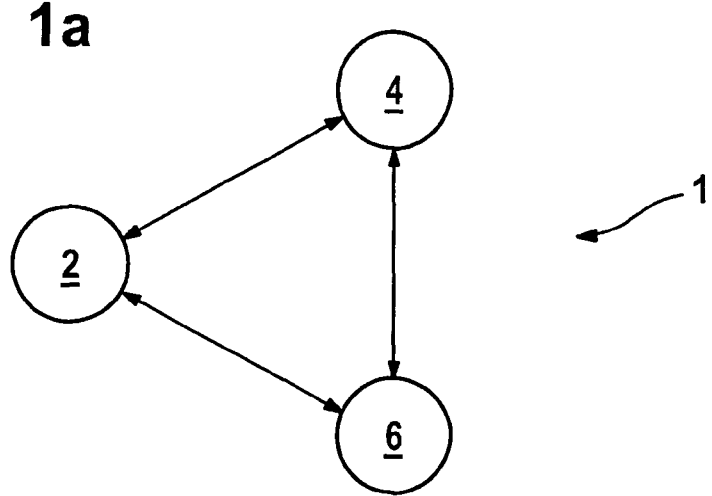

FIG. 1a shows system 1 according to the present invention which in this case includes three control units 2, 4, 6. These control units 2, 4, 6 are preferably situated within a vehicle. Software for implementing an operation of system 1 may distributed to one or more of control units 2, 4, 6. Control units 2, 4, 6 are interconnected with one another and for this purpose connected with one another via common communication means or communication paths such as CAN, for example. During operation of system 1 communication takes place between control units 2, 4, 6. For this purpose, information is exchanged between control units 2, 4, 6 as illustrated by the double arrows.

Figure 1B:
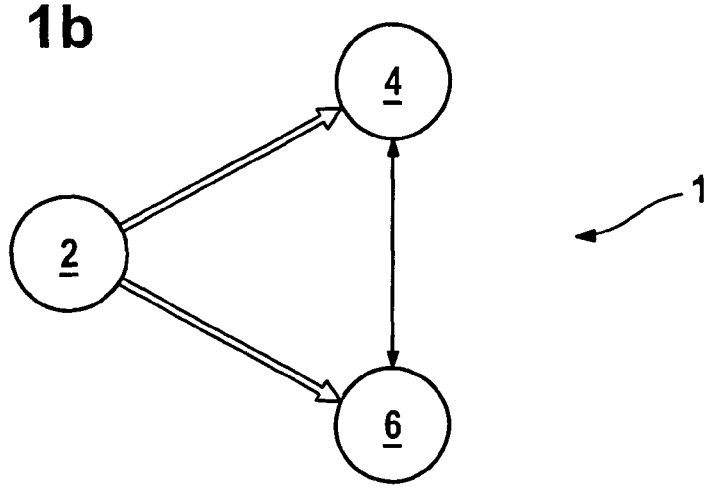

FIG. 1b shows a situation in which in this example a special state is reached, exists, or is imminent for control unit 2. This may mean that control unit 2 has an error which may corrected via a suitable measure. Alternatively, it is also possible that this measure is applied independently from an error, within the scope of a routine check of control unit 2, for example. Within the scope of this measure, a recovery, in particular a hardware or software reset, or reinitializing is carried out for control unit 2. Information about this is conveyed by control unit 2 to the other control units 4, 6 prior to execution of the measure, as is illustrated by the dashed arrows. During this process, these other control units 4, 6 are additionally informed of how long this measure lasts.

Figure 1C:
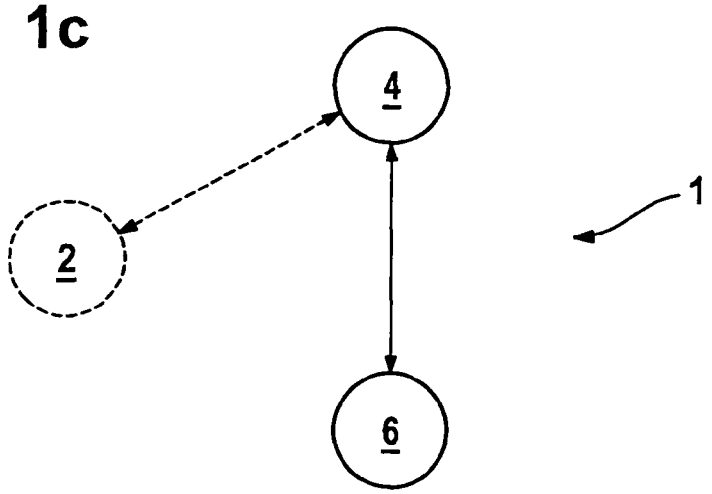

FIG. 1c shows system 1 during the special state in which the measure is executed for control unit 2. Communication between control unit 2 and the other control units 4, 6 is in this case only possible to a limited degree. For example, communication between control unit 2 and control unit 6 no longer takes place. Information is still exchanged between control unit 2 and control unit 4, as illustrated by the dashed double arrow, but because of the special state of control unit 2, this information may be erroneous.

Due to the measure according to the present invention to signal the special state of control unit 2, as schematically shown in FIG. 1c, to the other control units 4, 6, as schematically shown in FIG. 1b, in advance in a timely manner, the special state of control unit 2 does not affect the operation of the entire system 1 since the other control units 4, 6 have been informed in advance about this special state of control unit 2 in such a way that they take this special state into account. As soon as control unit 2 is again fully functional after correction of the error and/or execution of the measure, regular communication between all control units 2, 4, 6 within system 1 is again possible, as shown in FIG. 1a.

What is claimed is:

1. A method for operating a system including a plurality of control units, the method comprising:

in the event that a special state exists for a first one of the control units, performing one of the following:

using the first control unit to provide a signal to inform at least one of the other control units about the special state and a duration of the special state, and performing a correction of the special state on the first control unit;

wherein the other control units wait, due to a time-out value, for the signal that the first control unit resends after the special state, and wherein the other control units perform a shut-off operation only after absence of the special state and a time-out, and wherein the duration is determined as a function of at least one of a runtime of self-test of the first control unit and a runtime of recovery of the first control unit.

2. The method of claim 1, wherein the special state is caused by an error of the first control unit.

3. The method of claim 2, further comprising:
performing a measure on the first control unit, wherein the measure corrects the special state to a normal state.

4. The method of claim 3, wherein the measure is executed for the purpose of handling the error.

5. The method of claim 3, wherein the at least one of the other control units is informed prior to an execution of the measure.

6. The method of claim 1, wherein the at least one of the other control units is informed about a type and a duration of the special state.

7. The method of claim 1, further comprising:
ascertaining the duration as a function of the type of the special state.

8. The method of claim 1, further comprising:
taking into account a type of the special state, deciding whether an additional measure will be taken by the at least one of the other control units.

9. The method of claim 1, further comprising:
after the correction of the special state on the first control unit, restoring a communication channel between the first control unit and the at least one of the other control unit.

10. A system for operating a system including a plurality of control units, the system comprising:
a communications arrangement via which the control units are connected to one another; and
a processing arrangement for, in the event that a special state exists for a first one of the control units, using the first control unit to provide a signal to inform at least one of the other control units about the special state and a duration of the special state, and performing a correction of the special state on the first control unit, wherein the other control units wait, due to a time-out value, for the signal that the first control unit resends after the special state, and wherein the other control units perform a shut-off operation only after absence of the special state and a time-out;
wherein the duration is determined as a function of at least one of a runtime of self-test of the first control unit and a runtime of recovery of the first control unit.

11. The system of claim 10, wherein the processing arrangement, after the correction of the special state on the first control unit, restores a communication channel between the first control unit and the at least one of the other control unit.

12. A computer readable medium having a computer program pertaining to a system including a plurality of control units, the computer program, being executable on a first one of the control units, comprising:

a program code arrangement having program code, in the event that a special state exists for a first one of the control units, for performing the following,
using the first control unit to provide a signal to inform at least one of the other control units about the special state and a duration of the special state; and
performing a correction of the special state on the first control unit;

wherein the other control units wait, due to a time-out value, for the signal that the first control unit resends after the special state, and wherein the other control units perform a shut-off operation only after absence of the special state and a time-out, and wherein the duration is determined as a function of at least one of a runtime of self-test of the first control unit and a runtime of recovery of the first control unit.

13. The computer readable medium of claim 12, wherein after the correction of the special state on the first control unit, restoring a communication channel between the first control unit and the at least one of the other control unit.

14. A method for operating a system including a plurality of control units, the method comprising:
in the event that a special state exists for a first one of the control units, performing one of the following:
using the first control unit to provide a signal to inform at least one of the other control units about the special state and a duration of the special state, and
performing a correction of the special state on the first control unit;
performing a measure on the first control unit, wherein the measure corrects the special state to a normal state;
after the correction of the special state on the first control unit, restoring a communication channel between the first control unit and the at least one of the other control unit; and
ascertaining the duration as a function of the type of the special state;
wherein the other control units wait, due to a time-out value, for the signal that the first control unit resends after the special state, and wherein the other control units perform a shut-off operation only after absence of the special state and a time-out,
wherein the special state is caused by an error of the first control unit,
wherein the measure is executed for the purpose of handling the error,
wherein the at least one of the other control units is informed prior to an execution of the measure,
wherein the at least one of the other control units is informed about a type and a duration of the special state, and
wherein the duration is determined as a function of at least one of a runtime of self-test of the first control unit and a runtime of recovery of the first control unit.

15. The method of claim 14, further comprising:
taking into account a type of the special state, deciding whether an additional measure will be taken by the at least one of the other control units, wherein the at least one of the other control units is informed about a type and a duration of the special state.

* * * * *